United States Patent [19]

Rasmussen

[11] Patent Number: 4,971,170
[45] Date of Patent: Nov. 20, 1990

[54] CENTER DRIVE AUTOMOBILE

[76] Inventor: Evald Rasmussen, Box 405, Leaf Rapids, Manitoba, Canada, R0B 1W0

[21] Appl. No.: 453,917

[22] Filed: Dec. 20, 1989

[51] Int. Cl.⁵ ............................................. B62D 61/10
[52] U.S. Cl. ......................................................... 180/22
[58] Field of Search ................... 180/22, 23, 199, 200, 180/202

[56] References Cited

U.S. PATENT DOCUMENTS

| | | | |
|---|---|---|---|
| 670,405 | 3/1901 | Hunter | 180/22 |
| 698,836 | 4/1902 | Hight | 180/22 |
| 2,235,595 | 3/1941 | Stein | 180/22 |
| 2,422,460 | 6/1947 | Armington | 180/22 |
| 2,692,143 | 10/1954 | Rando | 180/202 |
| 3,370,665 | 2/1968 | Stanaback | 180/22 |
| 3,404,746 | 10/1968 | Slay | 180/23 |
| 3,439,765 | 4/1969 | Keegan | 180/22 |
| 3,502,165 | 3/1970 | Matsukata | 180/23 |
| 3,826,322 | 7/1974 | Williams | 180/202 |
| 3,871,465 | 3/1975 | Nichols | 180/24.02 |
| 3,876,026 | 4/1975 | Pronasko | 180/23 |
| 4,342,370 | 8/1982 | Hagin | 180/22 |

FOREIGN PATENT DOCUMENTS

| | | |
|---|---|---|
| 188293 | 1/1919 | Canada . |
| 258907 | 3/1926 | Canada . |
| 696854 | 10/1964 | Canada . |

*Primary Examiner*—Kenneth R. Rice
*Attorney, Agent, or Firm*—Robert W. B. Bailey

[57] ABSTRACT

The invention relates to a center drive car, having conventional steerable front wheels and rear wheels. The center drive has either roller or paired wheel traction. These are mounted on a swivel, which is directionally slave controlled by the conventional steering. A small motor, either directly linked via a differential, or more preferably via a hydraulic circuit including a differential, drives the central roller or wheels. The swivel is preferably retractable, by a lifting device, which may be operator controlled, or speed controlled by a governor. The center drive can be used under limited speed conditions, in a vehicle for urban use, where it would be more economical than a conventional high speed engine. It can also be used in a conventional vehicle under limited speed conditions, instead of the conventional engine.

20 Claims, 6 Drawing Sheets

CENTER DRIVE AUTOMOBILE

This invention relates to center drive automobiles, particularly it relates to center drive automobiles having steerable drive means.

DESCRIPTION OF PRIOR ART

Variations on rear and front drive means comprising center drive means are known. U.S. Pat. No. 670,405 to Hunter, Mar. 19, 1901, shows a six wheeled vehicle having fixed rear wheels, and a front pivoted steerable truck, or turntable, the truck has two forward support wheels, and two smaller rear steering wheels controlled by a steering lever, motors can be mounted on the vehicle (rear wheel drive) or the truck (front wheel drive). U.S. Pat. No. 698,836 to Hight, Apr. 29, 1902, shows a similar five wheeled vehicle, having a triangular front truck pivoted to the main chassis, the truck has paired rear drive wheels and a single front steering wheel. The engine is mounted on the front truck. Canadian Pat. No. 188,293 to Oversmith, Jan. 14, 1919 shows a four wheeled wagon having a central traction wheel, which may be manually raised from ground contract, the steering is controlled by the front wheels only. Canadian Pat. No. 258,907 to Edwards, Mar. 16, 1926, shows a six wheeled truck, having forward steering and center and rear drive wheels, the rear wheels are driven by a linear transmission extending through the central axle. The cargo frame is pivotally mounted above center and rear axles. Forward radius rods maintain the center wheels fixed with respect to the front frame, rear radius rods allow angular movement of the rear wheels. U.S. Pat. No. 2,422,460 to Armington, June 17, 1947, shows a tractor-trailer combine having four drive wheels driven by a normal axle with paired sprocket and chain drives (one for each drive wheel) steering is not indicated but is probably by differential braking on either side. Canadian Pat. No. 696,854 to Persson, Oct. 27, 1964, shows a six wheel tractor With liftable center idler wheels, which may be used to carry a rear half track. U.S. Pat. No. 8,370,665 to Stanaback, Feb. 27, 1968, shows a rigid rear four wheel drive arrangement for a motor bike style snowmobile, steering is provided by a front wheel, or runner attached thereto. U.S. Pat. No. 3,404,746 to Slay, Oct. 8, 1968, shows a vehicle with front and rear paired castor wheels, and a single center drive and steering wheel, in another version paired center drive and steering wheels are provided. U.S. Pat. No. 3,439,765 to Keegan, Apr. 22, 1969, shows a truck rig, having paired rear axles, the forward being a drive axle, the rear an idler axle. Paired friction wheels may be raised or lowered into the gap between the drive and idler wheels causing the forward wheel to transfer torque to the rear wheel. Canadian Pat. No. 3,502,165 to Matsukata, Mar. 24, 1970, shows a six wheel vehicle with steerable front gasoline drive wheels, and center electric drive wheels with extendible or retractable rear wheels, which are used to place or remove the center wheels from road contact. When the center wheels are in contact the electric drive is used, otherwise the gasoline drive is used. U.S. Pat. No. 8,871,465 to Nichols, Mar. 18, 1975, shows a six wheel vehicle with four support idler wheels, and separate electric drive wheels, a separate hydraulic piston arrangement varies road pressure. U.S. Pat. No. 3,876,026 to Pronasko, Apr. 8, 1975, shows a six wheel vehicle with four support idler caster wheels, and separate center paired steerable drive wheels driven by electric motor, mounted on a spar pivoted about a point corresponding to the middle of the front axle of the vehicle. U.S. Pat. No. 4,842,870 to Hagin, Aug. 3, 1982, shows an articulated bus having six wheels with the center pair being drive wheels, and the forward steering.

It is a principal object of the invention to provide an improved center drive for a vehicle. Other and further objects will become apparent to those skilled in the art from the description, claims and drawings.

DESCRIPTION OF THE INVENTION

In a broadest aspect the invention relates to an improvement in a vehicle for substrate travel having a chassis, paired front and rear support wheels rotatably mounted on the chassis for supporting the vehicle on the substrate, the front wheels having steering means; the improvement comprising traction means to contact the substrate mounted intermediate the front and rear wheels, drive motor means mounted on the chassis, driving connections between the motor means and the traction means, the traction means being rotatably mounted in swivel means, the swivel means being pivotal about a vertical axis and mounted on the vehicle, the swivel means being operatively associated with the steering means whereby the traction means are directionally controlled. The driving connections may be drive means directly connected to differential means on the traction means. The drive means are conventional and typically can be shaft drive means, which may include a universal joint means, belt drive means, which can be either V-belt means or timer belt means, or chain drive means, as those skilled in the art will be aware other conventional drive means can be substituted. Preferably the driving connections comprise hydraulic motor means operatively associated with the drive motor means, hydraulic differential means operatively associated with the traction means, hydraulic circuit means including the hydraulic motor means and the hydraulic differential means, the hydraulic motor means may be a pump arrangement, and the hydraulic differential means may be a hydraulic rotary actuator, or similar conventional hydraulic differential means.

In a further aspect the invention relates to an improvement in a vehicle for substrate travel having a chassis, paired front and rear support wheels rotatably mounted on the chassis for supporting the vehicle on the substrate, the front wheels having steering means; the improvement comprising traction means to contact the substrate mounted intermediate the front and rear wheels, drive motor means mounted on the chassis, driving connections between the drive motor and the traction means, the traction means being rotatably mounted in swivel means, the swivel means being pivotal about a vertical axis and mounted on the vehicle, the swivel means being operatively associated with the steering means, whereby the traction means are directionally controlled, the swivel means being mounted on retractable frame means mounted on the chassis, whereby the traction means can be withdrawn from a first position contacting the substrate to a second retracted position. Preferably the retractable frame means is retracted by raising and lowering means mounted on the chassis, which can be actuatable by governor means operatively controlled by servo-mechanism means operatively associated with the traction means, the raising means may also be operatively controlled by manually operable control means and the lowering means may be operatively controlled by manually operable control means. The traction means may be roller means, or less preferably rotary axle means bearing paired wheels.

The retractable features allow the operator to use the center drive in conjunction with a conventional front or rear drive. The governor would be set at whatever car speed was felt desirable for changeover to use of the conventional drive.

In another aspect the invention relates to an improvement in a vehicle for substrate travel having a chassis, paired front and rear support wheels rotatably mounted on the chassis for supporting the vehicle on the substrate, the front wheels having steering means; the improvement comprising traction means to contact the substrate mounted intermediate the front and rear wheels, drive motor means mounted on the chassis, hydraulic motor means operatively associated with the drive motor means, hydraulic differential means operatively associated with the traction means, hydraulic circuit means including the hydraulic motor means and the hydraulic differential means, the traction means being rotatably mounted in swivel means, the swivel means being pivotal about a vertical axis and mounted on the vehicle, the swivel means being operatively associated with the steering means, whereby the traction means are directionally controlled, the swivel means being mounted on retractable frame means mounted on the chassis, whereby the traction means can be withdrawn from a first position contacting the substrate to a second retracted position. Preferably the retractable frame means is retracted by raising and lowering means mounted on the chassis, which can be actuatable by governor means operatively controlled by servo-mechanism means operatively associated with the traction means, the raising means may also be operatively controlled by manually operable control means, and the lowering means may be operatively controlled by manually operable control means. The traction means may be roller means, or less preferably rotary axle means bearing paired wheels.

The roller means is preferably flexible rubber roller means. The drive motor is either a small two or four stroke, two or four piston internal combustion motor, in theory it could be a small steam engine, as well, or an electric motor.

The center drive of the invention is basically intended for urban use and to a lesser extent, limited speed highway travel, where a smaller motor would be more economical than the customary larger engine, conventionally provided in most vehicles for high speed highway travel. It may be incorporated into vehicles either as a substitute for the larger conventional engine, in which case it would preferably be used in a smaller urban use vehicle, or it could be used as a supplementary motor, for urban use only instead of the larger conventional engine. The conventional drive could be either a front wheel drive, a rear wheel drive, or a four wheel drive.

DESCRIPTION OF PREFERRED EMBODIMENTS

Preferred embodiments are indicated in the drawings where:

FIG. 20 is partly cutaway;

Figure 1:
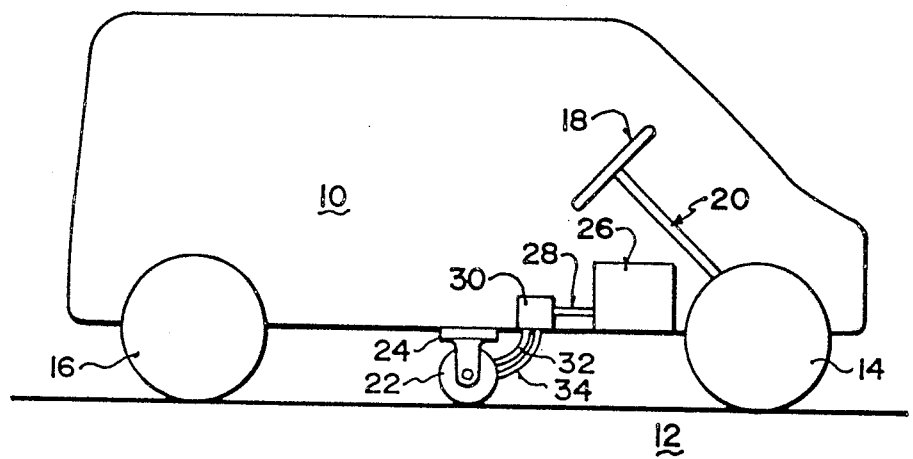
FIG. 1 shows a schematic side view of a preferred embodiment of the invention.
Figure 2:
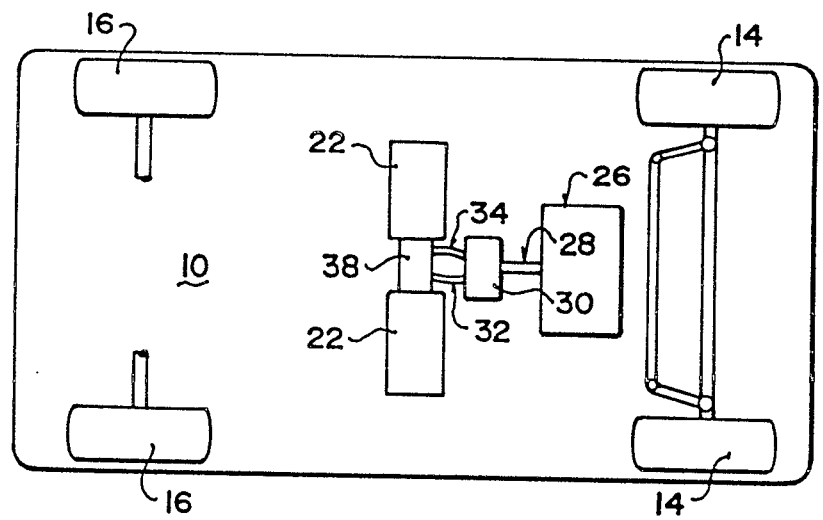
FIG. 2 shows a schematic top view of the embodiment of FIG. 1.
Figure 3:
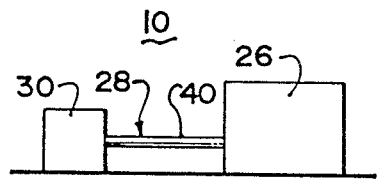
FIGS. 3 to 8 show cutaway schematic side views of alternative preferred drive arrangements of the invention.
Figure 4:
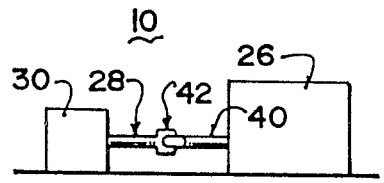
Figure 5:
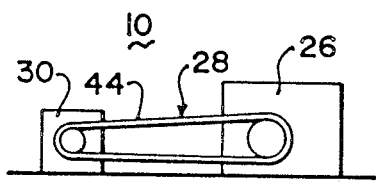
Figure 6:
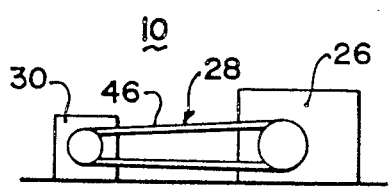
Figure 7:
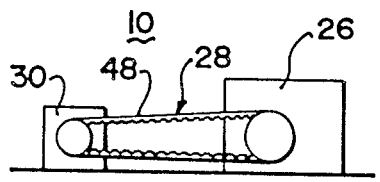
Figure 8:
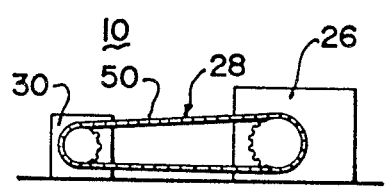
Figure 9:
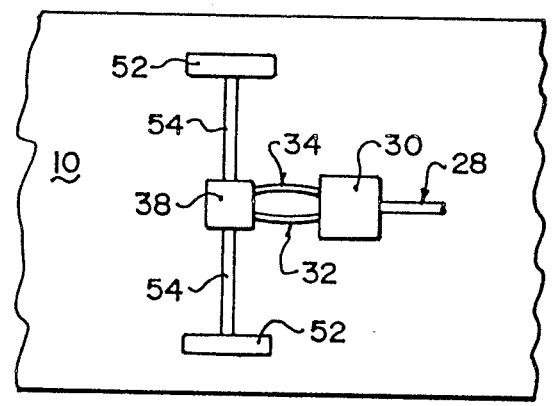
FIGS. 9 to 11 show schematic top views of other alternative drive embodiments to those of FIGS. 1 to 8.
Figure 10:
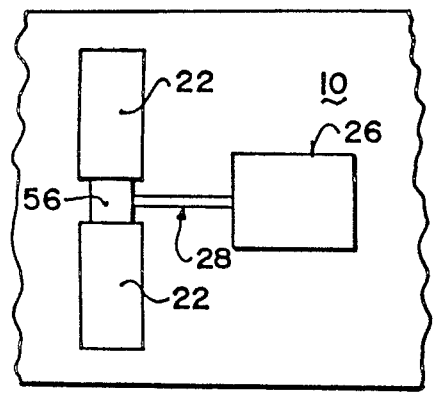
Figure 11:
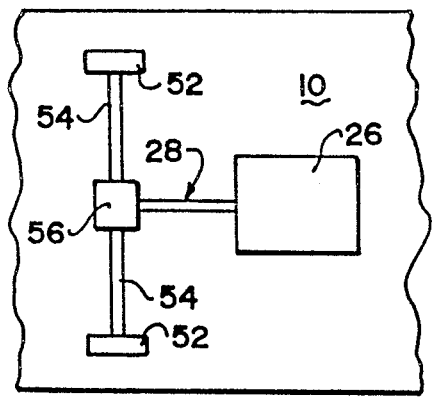
Figure 12:
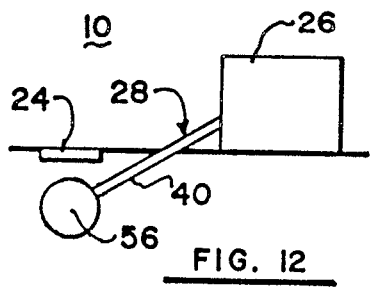
FIGS. 12 to 17 show cutaway schematic side views of other alternative preferred drive arrangements of the invention.
Figure 13:
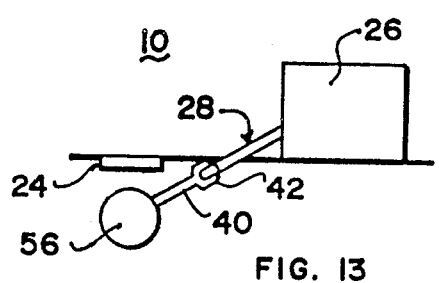
Figure 14:
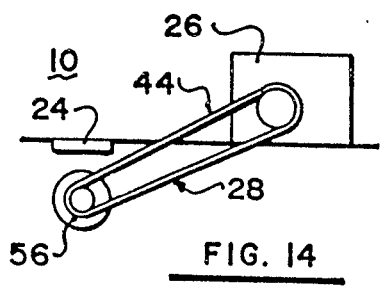
Figure 15:
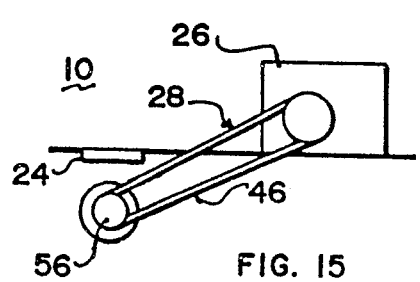
Figure 16:
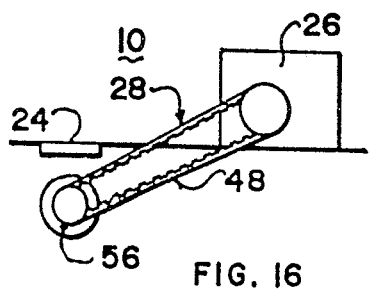
Figure 17:
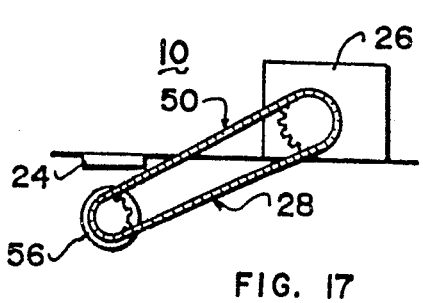
Figure 18:
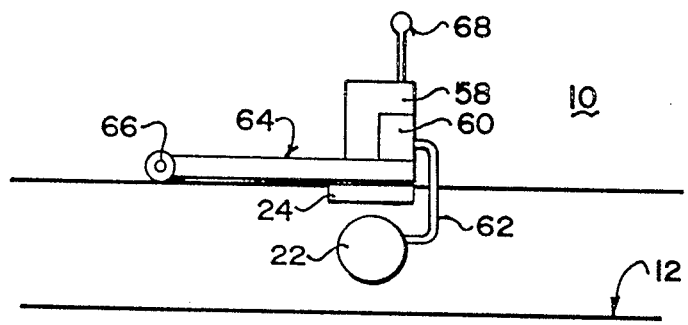
FIG. 18 shows a preferred form of swivel mounting of the invention.
Figure 19:
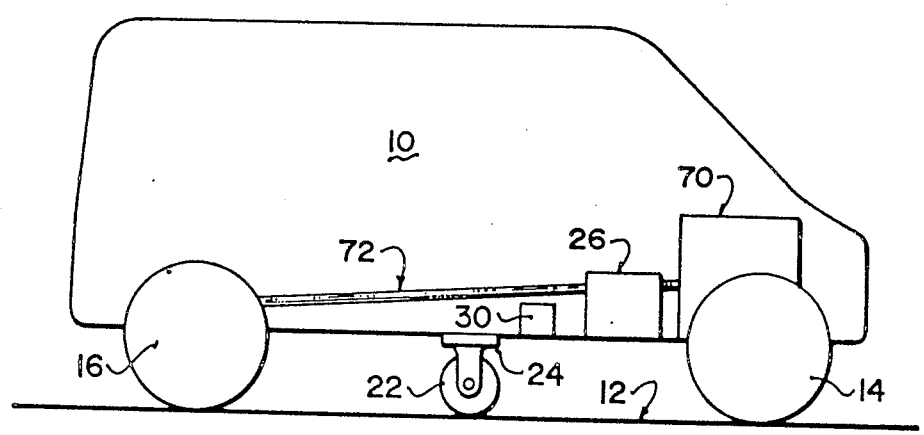
FIGS. 19 and 20 show vehicles with front and rear drives additionally including the center drive means of the invention.
Figure 20:
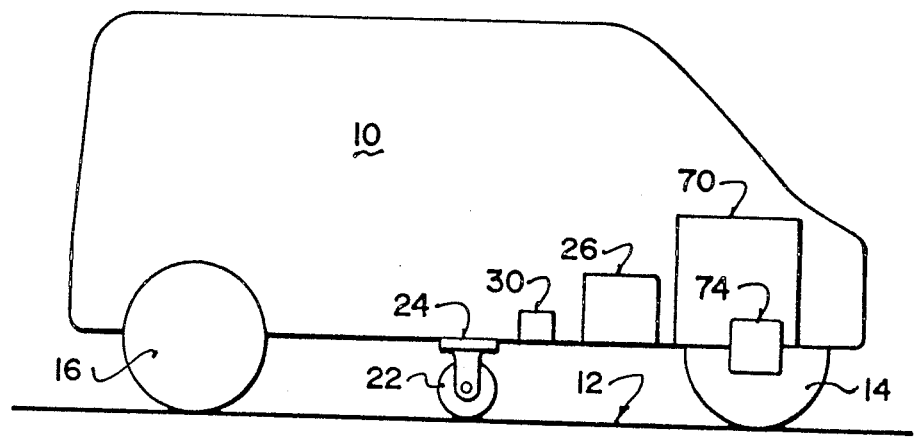

The general description of the invention is now expanded by reference to the drawings, which illustrate preferred embodiments of the invention. The numeral 10 indicates a vehicle standing on substrate 12, supported by front wheels 14 and rear wheels 16. Front wheels 14 are steerably controlled by conventional steering means, such as steering wheel 18 and steering shaft 20. Roller 22 mounted on swivel 24 provides traction means. Motor 26 provides power through transmission 28 to hydraulic motor 30, which in turn supplies power through hydraulic lines 32 and 34 to the roller 22, by hydraulic drive differential means 38, such as a hydraulic rotary actuator, or similar conventional hydraulic drive differential means. Roller 22 is mounted on swivel 24, which is directionally controlled by steering means controlled by the front wheel steering. Motor 26 is conventional and may be a two or four stroke small engine with 2 or 4 cylinders, or an electric motor. Alternative drive schemes are schematically indicated in FIGS. 8 to 8, where drive means 28 may be shaft drive 40, (FIG. 3), which may incorporate universal joint 42, (FIG. 4), or belt drive 44, (FIG. 5), which can be V-belt drive 46, (FIG. 6), timer belt drive 48 (FIG. 7), or chain drive 50, (FIG. 8). Alternately as shown in FIG. 9, wheels 52 mounted on axle 54 may be used instead of a roller, and which may be driven indirectly by hydraulic drive means 38. In FIGS. 10 and 11 are indicated direct linkage of drive means 28 to differential transmission 56 either for roller 22, (FIG. 10), or for axle 54 and wheels 52, (FIG. 11). In FIGS. 12 to 17 drive means 28 may be shaft drive 40, (FIG. 12), which may incorporate universal joint 42, (FIG. 13), or belt drive 44, (FIG. 14), which can be V-belt drive 46, (FIG. 15), timer belt drive 48, (FIG. 16), or chain drive 50 (FIG. 17). As shown in FIG. 18, swivel 24 may be raisable to remove roller 22 or wheels from substrate 12. The raising means 58, may be hydraulic and may be controlled by a governor 60, connected by servomechanism 62 to roller 22. On actuation raising means 58 lifts frame 64 carrying swivel means 24 about pivot 66, mounted on vehicle 10. Raising means 58 may also be actuatable by manual control 68. As shown in FIGS. 19 and 20, the vehicle 10 may further incorporate conventional motor means 70 having transmission 72 to rear wheels 16, (FIG. 19), or having transaxle 74 for front wheels 14, (FIG. 20) independent of the center drive means.

Figure 21:
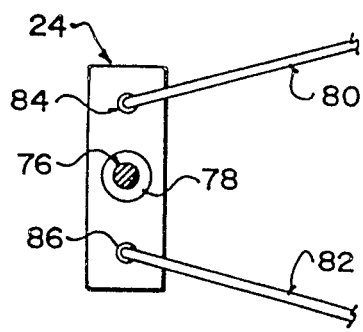
FIG. 21 shows a plan partly sectional view of preferred conventional steering means adapted for the invention.
Figure 22:
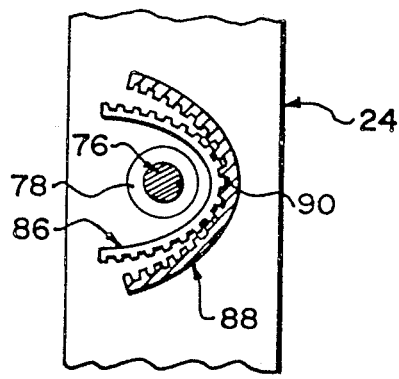
FIGS. 22 and 23 show partly sectional views of preferred optional details of the swivel mounting.
Figure 23:
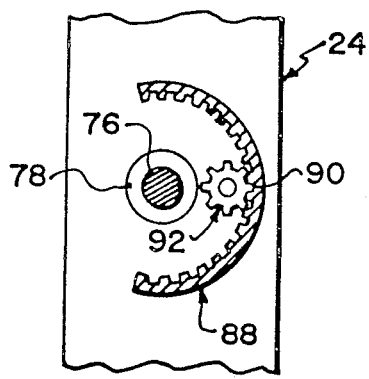
Figure 25:
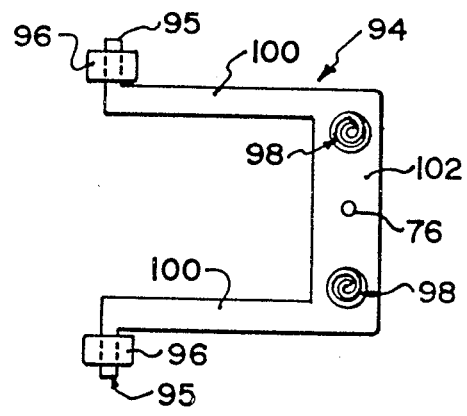
FIG. 25 shows a plan view of the same arrangement.

Swivel 24 may be swivelably attached or mounted by kingpin 76 on vehicle 10 (FIG. 21), optional conventional rotational bearing 78 may be present. Swivel direction is controlled through the conventional steering means of the front wheels, by additional steering rods 80 and 82 which are pivotally mounted at 84 and 86 respectively on swivel 24. This enables rotation of swivel 24 about kingpin 76. A gearing arrangement holds swivel 24 relative rotationally steady, this may have inner eccentric toothed arc 86 and outer circular toothed arc 88, which engage each other (FIG. 22), one may be mounted on swivel 24, the other on vehicle 10. On relative rotation of the swivel 24, the point of contact 90 changes as 86 and 88 move with respect to each other. Inner arc 86 can be replaced by rotatable inner cog wheel 92, allowing similar relative motion of contact point 90 (FIG. 23), one of arc 88 and cog wheel 92, is mounted on swivel 24 the other on vehicle 10.

Figure 24:
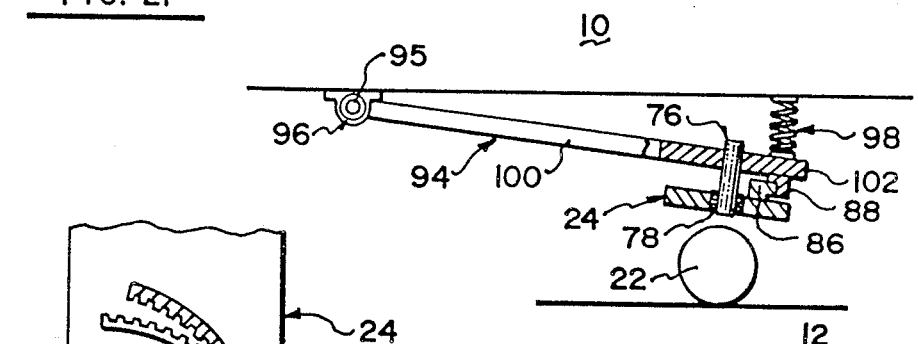
FIG. 24 shows a partly sectional view of a preferred swivel mounting arrangement.

The swivel may itself be mounted on pivoted frame 94 (FIGS. 24 and 26, attached to vehicle 10 by pins 95 mounted in conventional roller bearings 96 fixed to the vehicle, which allows upward or downward relative movement of frame 94, swivel 24, and roller 22, which thus maintains contact with substrate 12. Frame 94 includes arms 100 and center piece 102, which mounts king pin 76 coiled springs 98, which urge 94 downward, thus keeping roller 22 in road contact, here inner eccentric arc 86 is shown as part of swivel 24, while outer circular arc 88 is shown as part of center piece 102 of frame 94.

As those skilled in the art would realize these preferred illustrated dimensions, details and components can be subjected to substantial variation, modification, change, alteration, and substitution without affecting or modifying the function of the illustrated embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. In a vehicle for substrate travel having a chassis, paired front and rear support wheels rotatably mounted on said chassis for supporting said vehicle on said substrate, said front wheels having steering means; the improvement comprising traction means to contact said substrate mounted intermediate said front and rear wheels, drive motor means mounted on said chassis, driving connections between said motor means and said traction means, said traction means being rotatably mounted in swivel means, said swivel means being pivotal about a vertical axis and mounted on said vehicle, said swivel means being operatively associated with said steering means, whereby said traction means are directionally controlled.

2. The vehicle of claim 1, wherein said driving connections are drive means directly connected to differential means on said traction means.

3. The vehicle of claim 1, wherein said driving connections comprise hydraulic motor means operatively associated with said drive motor means, hydraulic differential means operatively associated with said traction means, hydraulic circuit means including said hydraulic motor means and said hydraulic differential means.

4. The vehicle of claim 2, wherein said drive means is shaft drive means.

5. The vehicle of claim 2, wherein said drive means is belt drive means.

6. The vehicle of claim 2, wherein said drive means is chain drive means.

7. The vehicle of claim 3, wherein said drive means is shaft drive means.

8. The vehicle of claim 3, wherein said drive means is belt drive means.

9. The vehicle of claim 3, wherein said drive means is chain drive means.

10. The vehicle of claim 4, wherein said shaft drive means comprises universal joint means.

11. In a vehicle for substrate travel having a chassis, paired front and rear support wheels rotatably mounted on said chassis for supporting said vehicle on said substrate, said front wheels having steering means; the improvement comprising traction means to contact said substrate mounted intermediate said front and rear wheels, drive motor means mounted on said chassis, driving connections between said drive motor and said traction means, said traction means being rotatably mounted in swivel means, said swivel means being pivotal about a vertical axis and mounted on said vehicle, said swivel means being operatively associated with said steering means, whereby said traction means are directionally controlled, said swivel means being mounted on retractable frame means mounted on said chassis, whereby said traction means can be withdrawn from a first position contacting said substrate to a second retracted position.

12. The vehicle of claim 11, wherein said retractable frame means is retracted by raising and lowering means mounted on said chassis.

13. The vehicle of claim 12, wherein said raising means is actuatable by governor means operatively controlled by servo-mechanism means operatively associated with said traction means, said raising means is also operatively controlled by manually operable control means, and said lowering means is operatively controlled by manually operable control means.

14. The vehicle of claim 13, wherein said traction means is roller means.

15. The vehicle of claim 13, wherein said traction means is rotary axle means bearing paired wheels.

16. In a vehicle for substrate travel having a chassis, paired front and rear support wheels rotatably mounted on said chassis for supporting said vehicle on said substrate, said front wheels having steering means; the improvement comprising traction means to contact said substrate mounted intermediate said front and rear wheels, drive motor means mounted on said chassis, hydraulic motor means operatively associated with said drive motor means, hydraulic differential means operatively associated with said traction means, hydraulic circuit means including said hydraulic motor means and said hydraulic differential means, said traction means being rotatably mounted in swivel means, said swivel means being pivotal about a vertical axis and mounted on said vehicle, said swivel means being operatively associated with said steering means, whereby said traction means are directionally controlled, said swivel means being mounted on retractable frame means mounted on said chassis, whereby said traction means can be withdrawn from a first position contacting said substrate to a second retracted position.

17. The vehicle of claim 16, wherein said retractable frame means is retracted by raising and lowering means mounted on said chassis.

18. The vehicle of claim 17, wherein said raising means is actuatable by governor means operatively controlled by servo-mechanism means operatively associated with said traction means, said raising means is also operatively controlled by manually operable control means, and said lowering means is operatively controlled by manually operable control means.

19. The vehicle of claim 18, wherein said traction means is roller means.

20. The vehicle of claim 18, Wherein said traction means is rotary axle means bearing paired wheels.

* * * * *